United States Patent
Hayashi et al.

(10) Patent No.: US 7,548,383 B2
(45) Date of Patent: Jun. 16, 2009

(54) OPTICAL PICKUP AND OBJECTIVE LENS USED THEREIN

(75) Inventors: Katsuhiko Hayashi, Osaka (JP);
Yasuhiro Tanaka, Hyogo (JP);
Michihiro Yamagata, Osaka (JP);
Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 22 days.

(21) Appl. No.: 11/808,930

(22) Filed: Jun. 13, 2007

(65) Prior Publication Data

US 2007/0291619 A1 Dec. 20, 2007

Related U.S. Application Data

(60) Provisional application No. 60/878,400, filed on Jan. 4, 2007.

(30) Foreign Application Priority Data

Jun. 13, 2006 (JP) .............................. 2006-163739

(51) Int. Cl.
*G02B 3/02* (2006.01)
*G11B 7/135* (2006.01)

(52) U.S. Cl. .............. 359/719; 369/112.01; 369/112.23

(58) Field of Classification Search ................ 359/718, 359/719, 721; 369/112.01, 112.02, 112.23
See application file for complete search history.

(56) References Cited

U.S. PATENT DOCUMENTS 6,556,533 B1 * 4/2003 Fukakusa et al. ....... 369/112.19
6,927,923 B2 * 8/2005 Kimura ....................... 359/719
7,110,344 B2 * 9/2006 Kimura .................. 369/112.23
7,283,450 B2 * 10/2007 Komma et al. ......... 369/112.02
2006/0002278 A1 * 1/2006 Kitazawa ............... 369/112.01
2007/0165510 A1 * 7/2007 Yamamoto ............. 369/112.28
2008/0049587 A1 * 2/2008 Hayashi et al. ........ 369/112.26
2008/0267044 A1 * 10/2008 Hayashi ................. 369/112.23
2009/0010113 A1 * 1/2009 Kamioka ................. 369/44.23
2009/0010141 A1 * 1/2009 Nagai ..................... 369/112.23
2009/0010142 A1 * 1/2009 Komma ................. 369/112.23

FOREIGN PATENT DOCUMENTS

JP 2006-031901 2/2006

* cited by examiner

*Primary Examiner*—David N Spector
(74) *Attorney, Agent, or Firm*—McDermott Will & Emery LLP

(57) ABSTRACT

An optical pickup 1 includes a collimator lens 13 for changing the shape of a laser light by moving on the optical axis AX from a base point. An objective lens 15 is set so as to form a spot of which size, when the collimator lens 13 is located at the base point, is minimum at a point apart from the light source side surface of an information recording medium 20 by a distance of $L_c$ defined by an expression (1):

$$L_c = (L_0 + L_n)/2 \qquad (1),$$

wherein $L_c$ is named as a thickness to the designed center;
$L_0$ is a distance between the light source side surface of the information recoding medium and an information recording face located nearest to the light source side surface; and
$L_n$ is a distance between the light source side surface of the information recording medium and an information recording face located farthest from the light source side surface.

10 Claims, 4 Drawing Sheets

Spherical aberration (mm)

Sine condition (mm)

Spherical aberration (mm)

Sine condition (mm)

-0.1000  -0.0500   0.0000   0.0500   0.1000
Spherical aberration (mm)

-0.100   -0.050   0.000   0.050   0.100
Sine condition (mm)

OPTICAL PICKUP AND OBJECTIVE LENS USED THEREIN

CROSS REFERENCE TO RELATED APPLICATIONS

This Non-provisional application claims priority under 35 U.S.C. § 119(a) on Patent Application No. 2006-163739 filed in Japan on Jun. 13, 2006, the entire contents of which are hereby incorporated by reference.

Further, the present application claims the benefit of the provisional application No. 60/878,400 flied in the U.S. on Jan. 4, 2007.

BACKGROUND OF THE INVENTION

1. Field of the Invention

The present invention relates to optical pickups and objective lenses used therein, and more particularly relates to an optical pickup for focusing a laser light onto respective information recording faces of an information recording medium including the information recording faces.

2. Background Art

Recently, research and development are progressing on information recording media (optical discs, such as a BD (Blu-ray Disc (registered trademark), for example) including a plurality of information recording faces. With a plurality of information recording faces, however, distances from the surface on a light source side of the information recording medium to respective information recording faces thereof are different from each other, and therefore, focusing of a laser light on the respective information recording faces through a single objective lens causes spherical aberration due to the difference in distance from the light source side surface to the respective information recording faces of the information recording medium. This makes it difficult to focus the laser light appropriately on the information recording faces. In view of the above problem, for example, Patent Document 1 (Japanese Patent Application Laid Open Publication No. 2006-31901) discloses that the angle of divergence of light incident to the objective lens is changed by driving a beam expander lens, a collimator lens, or the like in the direction of the optical axis to correct the spherical aberration caused due to the difference in distance from the light source side surface to the respective information recording faces of the information recording medium.

SUMMARY OF THE INVENTION

Mere movement of the collimator lens or the like in the direction of the optical axis may correct the spherical aberration insufficiently. Particularly, when the recording medium has three or more information recording faces, for example, four information recording faces, it is difficult to correct sufficiently the aberration with respect to each of the information recording faces.

The present invention has been made in view of the foregoing and has its object of providing an optical pickup capable of appropriately focusing a laser light onto a plurality of information recording faces provided in an information recording medium.

To achieve the above object, an optical pickup in accordance with the present invention is an optical pickup for focusing a laser light onto a plurality of information recording faces provided in parallel with each other in an information recording medium, the optical pickup including: a light source which emits the laser light; an objective lens for focusing the laser light entering the objective lens onto the information recording faces; and an aberration correction element arranged at a base point located between the light source and the objective lens, a position of the aberration correction element being configured to be movable on an optical axis from the base point, the aberration correction element being configured to change a shape of the laser light by moving the position of the aberration correction element on the optical axis from the base point so that the laser light is focused onto a target information recording face out of the plurality of information recording faces, wherein, when the aberration correction element is located at the base point, the objective lens forms a laser light spot having minimum size at a point in the information recording medium, the point being apart from a light source side surface of the information recording medium by a distance of $L_c$ defined by an expression (1):

$$L_c = (L_0 + L_n)/2 \tag{1},$$

wherein $L_0$ is a distance between the light source side surface of the information recoding medium and an information recording face nearest to the light source side surface; and $L_n$ is a distance between the light source side surface of the information recording medium and an information recording face located farthest from the light source side surface.

An objective lens in accordance with the present invention is provided for focusing a laser light onto a plurality of information recording faces provided in parallel with each other in an information recording medium, the objective lens being used in an optical pickup, the optical pickup including: a light source which emits the laser light; and an aberration correction element located at a base point located between the light source and the objective lens, a position of the aberration correction element being configured to be movable on an optical axis from the base point, the aberration correction element being configured to change a shape of the laser light by moving the position of the aberration correction element on the optical axis from the base point, wherein the objective lens is configured to focus the laser light from the aberration correction element, and the objective lens is configured to satisfy the condition that, when the aberration correction element is located at the base point, a size of a spot formed by the objective lens becomes minimum at a point in the information recording medium, the point being apart from a light source side surface of the information recording medium be a distance of $L_c$ defined by the above expression (1).

According to the present invention, an optical pickup can be attained which is capable of favorably focusing a laser light onto the respective information recording faces provided in an information recording medium.

DESCRIPTION OF THE PREFERRED EMBODIMENT

An embodiment of the present invention will be described below in detail with reference to the drawings.

Figure 1:
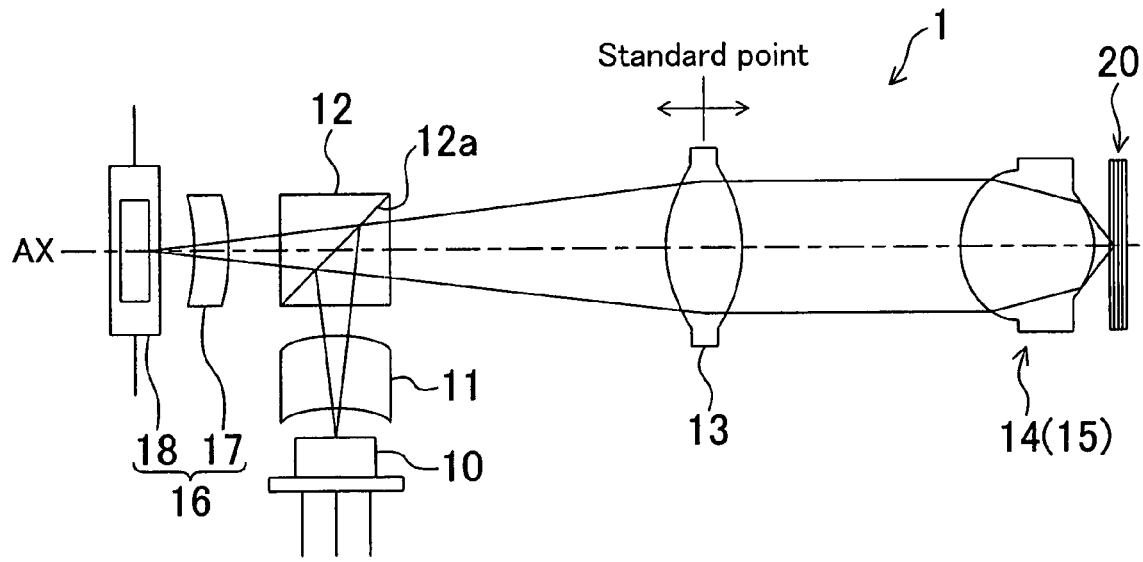
FIG. 1 is a diagram showing a main part of an optical pickup 1.

FIG. 1 is an illustration showing a construction of a main part of an optical pickup 1 in accordance with the present embodiment.

Figure 2:
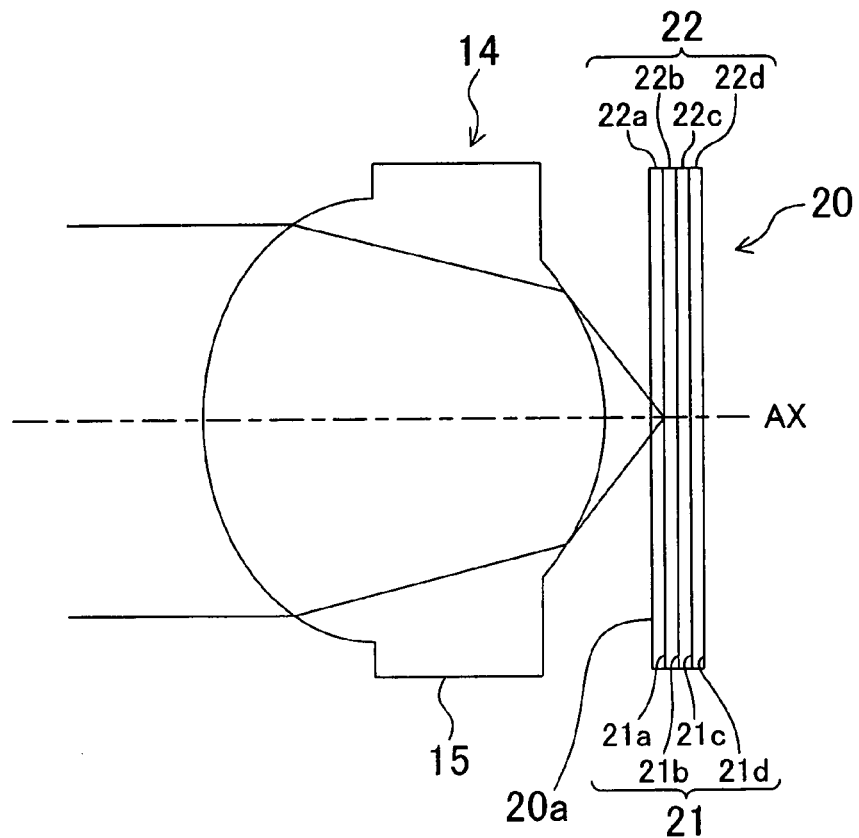
FIG. 2 is a sectional view in an enlarged scale showing the vicinity of an objective optical system 14.

FIG. 2 is a sectional view in an enlarged scale showing the vicinity of an objective lens 14.

The optical pickup 1 in accordance with the present embodiment focuses a laser light onto information recording faces 21 of an information recoding medium 20. The information recoding medium 20 is provided with a plurality of information recording faces 21 spaced apart from and in parallel with each other, and the optical pickup 1 focuses the laser light onto the respective plurality of information recording faces 21. Specifically, the information recording medium 20 is provided with four information recording faces 21 of a first information recording face 21a, a second information recoding face 21b, a third information recoding face 21c, and a fourth information recording face 21d, which are arranged in this order from the light source 10 side. A first protection layer 22a is provided on the light source 10 side of the first information recording face 21a. A second protection layer 22b is provided between the first information recording face 21a and the second information recording face 21b. A third protection layer 22c is provided between the second information recording face 21b and the third information recording face 21c. A fourth protection layer 22d is provided between the third information recording face 21c and the fourth information recording face 21d. The first protection layer 22a, the second protection layer 22b, the third protection layer 22c, and the fourth protection layer 22d may have substantially the same thickness or thicknesses different from each other. Though the present embodiment refers to the case with the four information recording faces as an example, the present invention is not limited thereto. The optical pickup in accordance with the present invention may focus a laser light onto two, three, five, or more recording information faces provided in an information recording medium.

As well, the kind of the information recording medium 20 is not limited specifically. The information recording medium 20 may be any optical disc, such as a CD (Compact Disc), a CD-R (Compact Disk Recordable), a CD-RW (Compact Disk ReWritable), a CD-ROM (Compact Disk Read Only Memory), a DVD (Digital Versatile Disc), a DVD-R (Digital Versatile Disc Recordable), a DVD-RW (Digital Versatile Disc ReWritable), a DVD-ROM (Digital Versatile Disc Read Only Memory), a DVD-RAM (Digital Versatile Disk Random Access Memory), an EVD (Enhanced Versatile Disc), an EVD-R (Enhanced Versatile Disc Recordable), an EVD-RW (Enhanced Versatile Disc ReWritable), an EVD-ROM (Enhanced Versatile Disc Read Only Memory), an EVD-RAM (Enhanced Versatile Disk Random Access Memory), a BD (Blu-ray Disc), a BD-R (Blu-ray Disc Recordable), a BD-RW (Blu-ray Disc ReWritable), a BD-ROM (Blu-ray Disc Read Only Memory), a BD-RAM (Blu-ray Disc Random Access Memory), a HD-DVD (High Definition Digital Versatile Disc), a HD-DVD-R (High Definition Digital Versatile Disc Recordable), a HD-DVD-RW (High Definition Digital Versatile Disc ReWritable), a HD-DVD-ROM (High Definition Digital Versatile Read Only Memory), a HD-DVD-RAM (High Definition Digital Versatile Disc Random Access memory), or the like, all of which are registered trademarks.

The optical pickup 1 includes a light source 10, a beam shaping lens 11, a beam splitter 12, a collimator lens 13, an objective optical system 14, and a detection system 16. The light source 10 emits a laser light (diverging ray) having a wavelength corresponding to the kind of the information recording medium 20. For example, in the case where the information recording medium 20 is a BD (registered trademark), the light source 10 emits a laser light having a wavelength of 378 to 438 nm (which may be less than 420 nm). In the case where the information recording medium 20 is a DVD (registered trademark), the light source 10 emits a laser light having a wavelength of 630 to 690 nm. As well, in the case where the information recording medium 20 is a CD (registered trademark), the light source 10 emits a laser light having a wavelength of 750 to 810 nm. Alternatively, in the case where the optical pickup 1 is provided for focusing laser lights onto three kinds of optical discs of a CD, a DVD, and a BD, for example, the light source 10 can selectively emit a laser light having a wavelength corresponding to any optical disc put in the optical pickup 1.

The beam shaping lens 11 is arranged before the light source 10 to shape the laser light emitted from the light source 10 into a desired shape. The laser light shaped by the beam shaping lens 11 is reflected by a reflection face 12a of the beam splitter 12 toward the information recording medium 20. The collimator lens (a single lens or a combination of a plurality of lenses) 13 and the objective optical system 14 for focusing the laser light on the respective information recording faces 21 of the information recording medium 20 are arranged between the beam splitter 12 and the information recording medium 20. It is noted that the objective optical system 14 is composed of only an objective lens 15 in the present embodiment, but may be composed of the objective lens 15 and one or more other optical elements, such as a phase correction element, a beam expander lens, or the like according to needs.

The NA of the objective lens 15 is not limited specifically and is preferably 0.8 or larger, for example, when the optical pickup 1 focuses the laser light onto a BD (trademark) or the like.

The laser light focused on any of the information recording faces 21 of the information recording medium 20 through the objective optical system 14 is reflected by the information recording face 21. Then, the light reflected by the information recording face 21 passes through the objective optical system 14, the collimator lens 13, and the beam splitter 12 and is then incident to the detection system 16. The detection system 16 is composed of a detector 18 and a detection lens 17 for focusing the reflected light onto the detector 18 so that the reflected light focused by the detection lens 17 is detected in the detector 18.

In the present embodiment, the collimator lens 13, which functions as an aberration correction element, is arranged at a base point between the beam splitter 12 and the objective lens 15 (the objective optical system 14), and is configured to be movable on the optical axis AX from the base point. The collimator lens 13 moves on the optical axis AX from the base point for the laser light to be focused appropriately onto a target information recording face 21 out of the plurality of information recording faces 21 through the objective lens 15 (the objective optical system 14). In other words, the position on the optical axis AX of the collimator lens 13 as an aberration correction element is adjusted according to the position on the optical axis AX of the target information recording face onto which the laser light is to be focused, so that the laser light is focused on the respective information recording faces 21 appropriately. Specifically, suppose that the case, for example, where the objective lens 15 is so designed optically that the laser light is focused appropriately onto the first information recording face 21a through the objective optical system 14 when the collimator lens 13 is located at the base point. In order to focus the laser light onto an information recording face 21 other than the first information recording face 21a, for example, the second information recording face 21b, the position on the optical axis AX of the collimator lens 13 is adjusted to adjust the shape (angle of divergence or the like) of the laser light so that the laser light is focused appropriately onto the second information recording face 21b through the objective optical system 14. Thus, the optical pickup 1 of the present embodiment can focus the laser light appropriately onto the plural information recording faces 21 provided in the information recording medium 20.

Further, in the present embodiment, the objective lens 15 composing the objective optical system 14 is designed, when the collimator lens 13 as an aberration correction element is located at the base point, to form a laser light spot having minimum size at a point in the information recording medium 20 apart from the light source 10 side surface 20a of the information recording medium 20 by a distance of $L_c$ defined by the following expression (1):

$$L_c = (L_0 + L_n)/2 \tag{1}$$

wherein $L_c$ is named as a thickness to a designed center;

$L_0$ is a distance between the light source 10 side surface of the information recoding medium 20 and the information recording face 21a located the nearest to the light source 10 side surface; and $L_n$ is a distance between the light source 10 side surface of the information recording medium 20 and the information recording face 21a located the farthest from the light source 10 side surface.

The above arrangement effectively alleviates degradation of aberrations at each of the plurality of information recording faces 21 (degradation caused due to the spherical aberration, various aberrations caused by a incident laser light displaced from the axis, various aberrations caused by the objective lens 15 being inclined relative to the optical axis AX, various aberrations caused by the information recording medium 20 being inclined relative to the optical axis AX, and the like). With the above arrangement, displacement of the collimator lens 13 as the aberration correction element on the optical axis AX becomes relatively small, and the difference between displacement thereof from the base point toward the light source 10 and that toward the information recording medium 20 reduces. Hence, stable replay and the like of data recorded in the information recording medium 20 can be achieved. Though these effects can be attained also in the case where the number of information recording faces 21 is two, these effects are exhibited more noticeably in the case where the number of information recording faces 21 is three or larger, further, four or larger. In addition, these effects are significant in an optical pickup used for a DVD (registered trademark), a BD (registered trademark) or the like to which laser lights having comparatively short wavelengths are applied.

It is preferable to set the distance between the surface 20a of the information recording medium 20 and the information recording face 21a located the nearest to the surface 20a to be less than 100 μm, more preferably, less than 75 μm, further preferably, less than 60 μm. With this arrangement, the aberration at the information recording face 21a can be minimized even when disc warp, disc wobbling, disc inclination, or the like of the information recording medium 20 occurs.

Further, the objective lens 15 is preferably set so that the distance between the surface 20a and a point on the optical axis AX where the aberration when parallel light is incident in the objective lens 15 is minimum to be less than 80 μm. With this arrangement, a higher order aberration caused when the objective lens 15 is used with changing its magnification can be balanced favorably, and the thickness of the information recording medium 20 becomes relatively small as a whole. Moreover, the objective lens 15 under this arrangement is preferably set so as to satisfy the following conditional expression (2), more preferably, satisfy the following conditional expression (2-1). This arrangement enables favorable recording and replay especially when parallel light is incident. When non-parallel light is incident, a higher order aberration is caused even in this arrangement. Therefore, it is preferable to set an aberration caused when parallel light is incident to be small as far as possible, specifically, 50 mλ or smaller.

$$\lambda_1 < 70 \, m\lambda \tag{2}$$

wherein, $\lambda_1$ is an aberration at a point on the optical axis AX where the aberration is minimum when parallel light is incident to the objective lens 15; and $\lambda$ is a wavelength of a laser light.

$$\lambda_1 < 50 m\lambda \tag{2-1}$$

wherein, $\lambda_1$ is an aberration at a point on the optical axis AX where the aberration is minimum when parallel light is incident to the objective lens 15; and $\lambda$ is a wavelength of a laser light.

The optical pickup in this embodiment is capable of focusing the laser light on only one kind of information recording medium, but may be capable of focusing laser lights on plural kinds of information recording media. If so, the objective optical system 14 may be composed of a combination of the objective lens 15 and a phase correction element for correcting the phase of the light incident to the objective lens 15, a beam expander lens, or the like. Alternatively, the optical pickup may be so composed that a dedicated objective lens is provided for each information recording medium.

Further, the collimator lens 13 is used as an aberration correction element herein, but the aberration correction element may be a single beam expander lens disposed between a collimator lens and an objective lens or a combination of a beam expander lens and a collimator lens. Alternatively, a liquid crystal lens, a liquid lens, or the like may be used as the aberration correction element.

Moreover, in the present embodiment, each optical element, such as the lens and the like may have only a refraction face having only a refraction function substantially, and may have an additional optical function serving as a diffraction face, a phase step face, or the like. The materials of the optical elements, such as the lens and the like are not limited specifically and may be glass or resin.

The optical pickup 1 may further include any element not substantially involving influence on a transmitted wave front aberration between the light source 10 and the information recording medium 20.

EXAMPLE

Further detailed description will be given below to the optical pickup 1 of the present invention by referring to construction data, aberration figures, and the like. In each of the following numeral examples, each faces having an aspheric coefficient means an aspheric dioptric face or a face having a refractive function equivalent to that of an aspheric surface (a diffraction face or the like, for example) and is defined by the following conditional expression (*) that expresses a contour of an aspheric surface:

$$X = \frac{C_j h^2}{1 + \sqrt{1 - (1 + k_j) C_j^2 h^2}} + \sum A_{j,n} h^n \quad (*)$$

wherein: X is a distance from the contact plane of the vertex of an aspheric surface to a point on the aspheric surface at a height h from the optical axis;

h is a height from the optical axis;

$C_j$ is a curvature at the vertex of an aspheric surface of a j-th plane of a lens ($C_j=1/R_j$);

$K_j$ is a conic constant of a j-th plane of a lens; and $A_j$, n is an nth-order aspheric constant of a j-th plane of a lens, wherein j is 1, 2, 3, or 4.

Numeral Example 1

Construction data in Numeral Example 1 is indicated in Tables 1 to 3.

TABLE 1

| Wavelength (nm) | 408 |
|---|---|
| Aperture diameter (mm) | 2.3 |
| NA | 0.86 |
| Working distance (WD) (mm) | 0.3 |
| Disc thickness (DT) (mm) | 0.07 |

TABLE 2

| Face number (#) | Curvature radius of vertex (mm) | Thickness (mm) | Material | Remarks |
|---|---|---|---|---|
| 0 | ∞ | ∞ | Air | |
| 1 | 0.9906128 | 1.918538 | nl | Aspheric face |
| 2 | −1.365884 | WD | Air | Aspheric face |
| 4 | ∞ | DT | disk | Plane face |
| 5 | ∞ | | | Plane face |

TABLE 3

| Wavelength (nm) | 408 |
|---|---|
| nl | 1.62340933 |
| disk | 1.61641628 |

In Numerical Example 1:

the distance from the surface 20a of the information recording medium 20 to the first information recording face 21a is 40.0 μm;

the distance from the surface 20a of the information recording medium 20 to the second information recording face 21b is 67 μm;

the distance from the surface 20a of the information recording medium 20 to the third information recording face 21c is 86 μm;

the distance from the surface 20a of the information recording medium 20 to the fourth information recording face 21d is 100 μm;

the thickness to the designed center is 70 μm;

the focal length of the objective lens 15 is 1.34 mm; and the effective diameter of the objective lens 15 is 2.3 mm.

Table 4 indicates the aspheric coefficients of the first face (#1: the side face on the light source 10 side of the objective lens 15). Table 5 indicates the aspheric coefficients of the second face (#2: the side face on the information recording medium 20 side of the objective lens 15).

TABLE 4

| RD | 0.9906128 |
|---|---|
| CC | −0.382704 |
| A2 | 0 |
| A4 | −0.010774067 |
| A6 | −0.013961381 |
| A8 | 0.019394478 |
| A10 | −0.035907468 |
| A12 | 0.010513166 |
| A14 | 0.01636706 |
| A16 | −0.016837378 |

TABLE 5

| RD | −1.365884 |
|---|---|
| CC | 0 |
| A2 | 0 |
| A4 | 2.154957 |
| A6 | −8.4540969 |
| A8 | 13.645259 |
| A10 | 17.975849 |
| A12 | −117.27974 |
| A14 | 191.80697 |
| A16 | −111.39863 |

Figure 3:
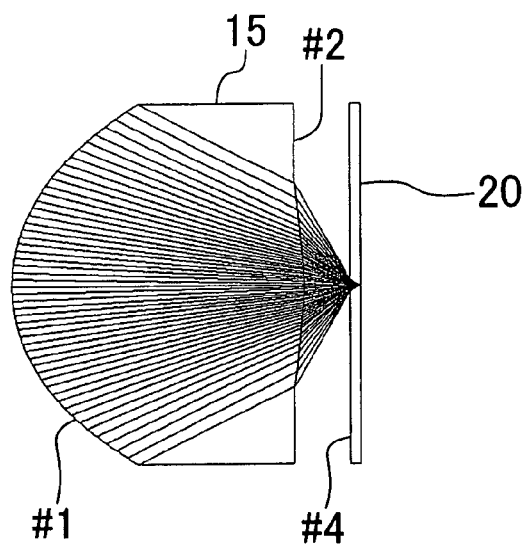
FIG. 3 is a diagram showing light paths in the vicinity of an objective lens 15 of an optical pickup in accordance with Numerical Example 1.

FIG. 3 shows the optical paths in the vicinity of the objective lens 15 of the optical pickup 1 in Numeral Example 1.

Figure 4:
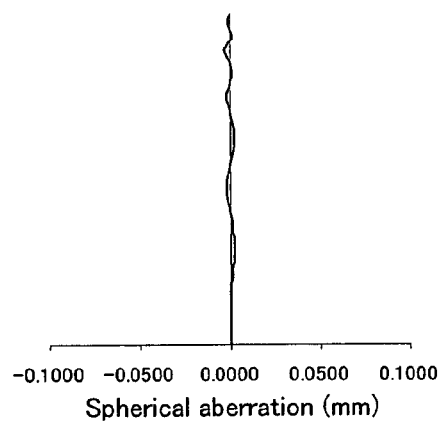
FIG. 4 is a graph showing the spherical aberration when parallel light is incident to the objective lens 15 in Numerical Example 1.

FIG. 4 is a graph showing the spherical aberration when parallel light is incident to the objective lens 15 (object distance is ∞ and magnification is ∞) in Numeral Example 1.

Figure 5:
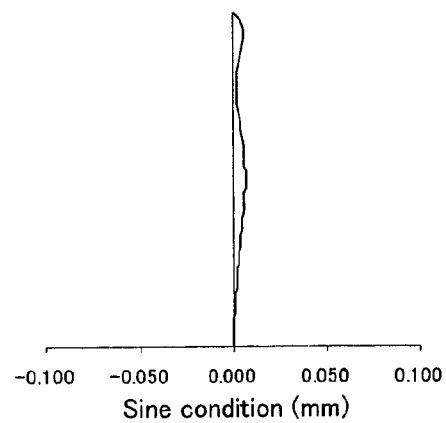
FIG. 5 is a graph showing the sine condition when parallel light is incident to the objective lens 15 in Numerical Example 1.

FIG. 5 is a graph showing the sine condition when parallel light is incident to the objective lens 15 (object distance is ∞ and magnification is ∞) in Numeral Example 1.

Table 6 indicates the total aberrations and the like in Numerical Example 1.

TABLE 6

Focal length of objective lens: 1.34 mm

| Protection layer thickness [μm] | Object distance [mm] | Magnification | Total aberration [mλ] |
|---|---|---|---|
| 70 | ∞ | 0 | 1.5 |
| 40 | −114 | −0.012 | 29.2 |
| 67 | −1207 | −0.001 | 3.2 |
| 86 | 236 | 0.006 | 15 |
| 100 | 129 | 0.010 | 27.7 |

Numeral Example 2

Construction data in Numeral Example 2 is indicated in Tables 7 to 9.

TABLE 7

| Wavelength (nm) | 408 |
|---|---|
| Aperture diameter (mm) | 2.3 |
| NA | 0.86 |
| Working distance (WD) (mm) | 0.3 |
| Disc thickness (DT) (mm) | 0.055 |

TABLE 8

| Face number (#) | Curvature radius of vertex (mm) | Thickness (mm) | Material | Remarks |
|---|---|---|---|---|
| 0 | ∞ | ∞ | Air | |
| 1 | 0.9914674 | 1.937965 | n1 | Aspheric face |
| 2 | −1.323078 | WD | Air | Aspheric face |
| 4 | ∞ | DT | disk | Plane face |
| 5 | ∞ | | | Plane face |

TABLE 9

| Wavelength (nm) | 408 |
|---|---|
| n1 | 1.62340933 |
| disk | 1.61641628 |

In Numeral Example 2:

the distance from the surface 20a of the information recording medium 20 to the first information recording face 21a is 10.0 μm;

the distance from the surface 20a of the information recording medium 20 to the second information recording face 21b is 32.5 μm;

the distance from the surface 20a of the information recording medium 20 to the third information recording face 21c is 77.5 μm;

the distance from the surface 20a of the information recording medium 20 to the fourth information recording face 21d is 100 μm;

the thickness to the designed center is 55 μm;

the focal length of the objective lens 15 is 1.34 mm; and the effective diameter of the objective lens 15 is 2.3 mm.

Table 10 indicates the aspheric coefficients of the first face (#1: the side face on the light source 10 side of the objective lens 15). Table 11 indicates the aspheric coefficients of the second face (#2: the side face on the information recording medium 20' side of the objective lens 15).

TABLE 10

| RD | 0.9914674 |
|---|---|
| CC | −0.3793052 |
| A2 | 0 |
| A4 | −0.011239542 |
| A6 | −0.015183551 |
| A8 | 0.022888322 |
| A10 | −0.04458094 |
| A12 | 0.02051713 |
| A14 | 0.010791066 |
| A16 | −0.015767717 |

TABLE 11

| RD | −1.323078 |
|---|---|
| CC | 0 |
| A2 | 0 |
| A4 | 2.3276163 |
| A6 | −9.684436 |
| A8 | 17.621778 |
| A10 | 14.497018 |
| A12 | −129.63899 |
| A14 | 226.42226 |
| A16 | −137.31857 |

Figure 6:
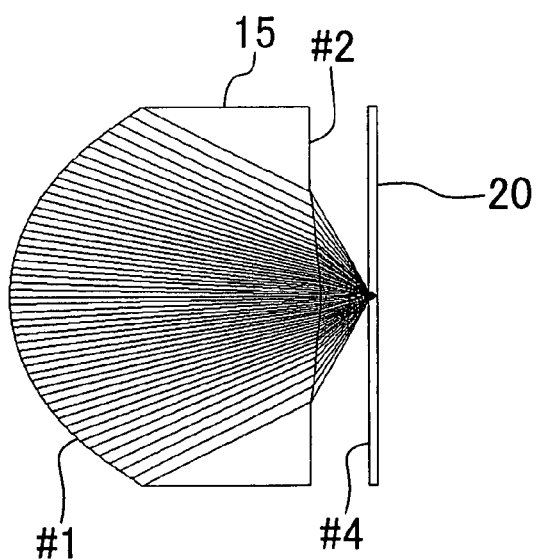
FIG. 6 is a diagram showing light paths in the vicinity of the objective lens 15 of an optical pickup in accordance with Numerical Example 2.

FIG. 6 shows the optical paths in the vicinity of the objective lens 15 of the optical pickup 1 in Numeral Example 2.

Figure 7:
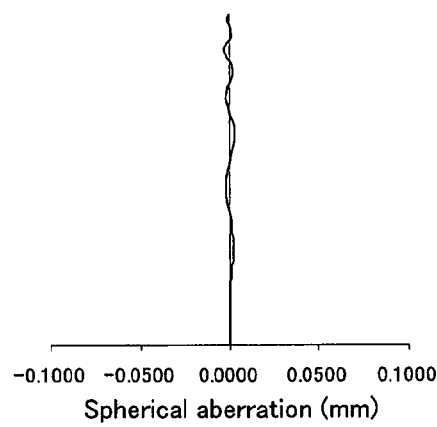
FIG. 7 is a graph showing the spherical aberration when parallel light is incident to the objective lens 15 (object distance is Go and magnification is ∞) in Numerical Example 2.

FIG. 7 is a graph showing the spherical aberration when parallel light is incident to the objective lens 15 (object distance is ∞ and magnification is ∞) in Numeral Example 2.

Figure 8:
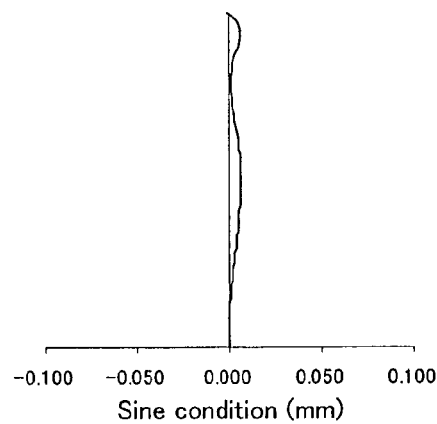
FIG. 8 is a graph showing the sine condition when parallel light is incident to the objective lens 15 (object distance is ∞ and magnification is ∞) in Numerical Example 2.

FIG. 8 is a graph showing the sine condition when parallel light is incident to the objective lens 15 (object distance is ∞ and magnification is ∞) in Numeral Example 2.

Table 12 indicates the total aberrations and the like in Numerical Example 2.

TABLE 12

Focal length of objective lens: 1.34 mm

| Protection layer thickness [μm] | Object distance [mm] | Magnification | Total aberration [mλ] |
|---|---|---|---|
| 55 | ∞ | 0 | 1.7 |
| 10 | −74 | −0.018 | 45.9 |
| 32.5 | −155 | −0.009 | 22.2 |
| 77.5 | 169 | 0.008 | 21.3 |
| 100 | 88 | 0.015 | 41.9 |

Numerical Example 3

Construction data in Numeral Example 3 is indicated in Tables 13 to 15.

TABLE 13

| Wavelength (nm) | 408 |
|---|---|
| Aperture diameter (mm) | 2.4 |
| NA | 0.86 |
| Working distance (WD) (mm) | 0.3 |
| Disc thickness (DT) (mm) | 0.07975 |

TABLE 14

| Face number (#) | Curvature radius of vertex (mm) | Thickness (mm) | Material | Remarks |
|---|---|---|---|---|
| 0 | ∞ | ∞ | Air | |
| 1 | 1.042587 | 2.037574 | n1 | Aspheric face |
| 2 | −1.336755 | WD | Air | Aspheric face |
| 4 | ∞ | DT | disk | Plane face |
| 5 | ∞ | | | Plane face |

TABLE 15

| Wavelength (nm) | 408 |
|---|---|
| n1 | 1.62340933 |
| disk | 1.61641628 |

In Numerical Example 3:

the distance from the surface 20a of the information recording medium 20 to the first information recording face 21a is 59.5 μm;

the distance from the surface 20a of the information recording medium 20 to the second information recording face 21b is 67 μm;

the distance from the surface 20a of the information recording medium 20 to the third information recording face 21c is 86 μm;

the distance from the surface 20a of the information recording medium 20 to the fourth information recording face 21d is 100 μ/m;

the thickness to the designed center is 79.75 μm;

the focal length of the objective lens 15 is 1.4 mm; and the effective diameter of the objective lens 15 is 2.4 mm.

Table 16 indicates the aspheric coefficients of the first face (#1: the side face on the light source 10 side of the objective lens 15). Table 17 indicates the aspheric coefficients of the second face (#2: the side face on the information recording medium 20 side of the objective lens 15).

TABLE 16

| RD | 1.042587 |
|---|---|
| CC | −0.402654 |
| A2 | 0 |
| A4 | −0.007098588 |
| A6 | −0.00536142 |
| A8 | 0.000867341 |
| A10 | −0.002003148 |
| A12 | −0.008206388 |
| A14 | 0.011241589 |
| A16 | −0.006982069 |

TABLE 17

| RD | −1.336755 |
|---|---|
| CC | 0 |
| A2 | 0 |
| A4 | 2.1838127 |
| A6 | −9.3141725 |
| A8 | 22.124907 |
| A10 | −20.233003 |
| A12 | −24.702688 |
| A14 | 74.10368 |
| A16 | −49.658095 |

Figure 9:
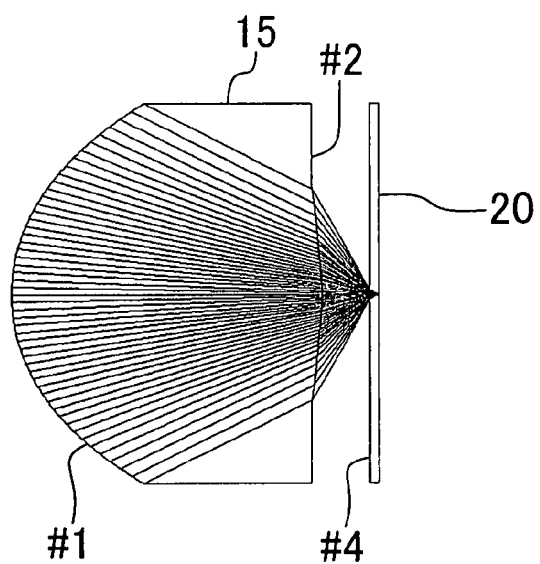
FIG. 9 is a diagram showing light paths in the vicinity of the objective lens 15 of an optical pickup in accordance with Numerical Example 3.

FIG. 9 shows the optical paths in the vicinity of the objective lens 15 of the optical pickup 1 in Numeral Example 3.

Figure 10:
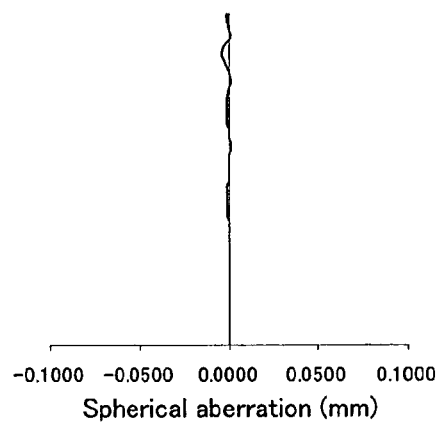
FIG. 10 is a graph showing the spherical aberration when parallel light is incident to the objective lens 15 (object distance is ∞ and magnification is ∞) in Numerical Example 3.

FIG. 10 is a graph showing the spherical aberration when parallel light is incident to the objective lens 15 (object distance is ∞ and magnification is ∞) in Numeral Example 3.

Figure 11:
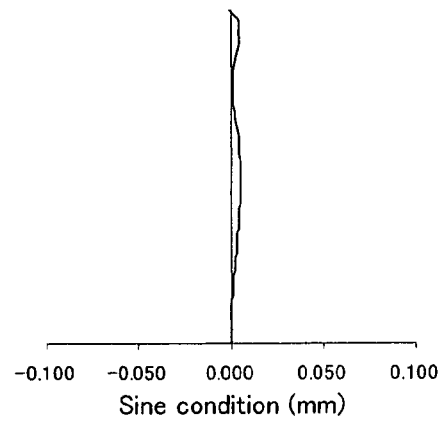
FIG. 11 is a graph showing the sine condition when parallel light is incident to the objective lens 15 (object distance is ∞ and magnification is ∞) in Numerical Example 3.

FIG. 11 is a graph showing the sine condition when parallel light is incident to the objective lens 15 (object distance is ∞ and magnification is ∞) in Numeral Example 3.

Table 18 indicates the total aberrations and the like in Numerical Example 3.

TABLE 18

Focal length of objective lens: 1.4 mm

| Protection layer thickness [μm] | Object distance [mm] | Magnification | Total aberration [mλ] |
|---|---|---|---|
| 79.75 | ∞ | 0 | 1.2 |
| 59.5 | −190 | −0.007 | 17.4 |
| 67 | −305 | −0.005 | 11 |
| 86 | 647 | 0.002 | 5.1 |
| 100 | 204 | 0.007 | 16.5 |

The optical pickup in accordance with the present invention can focus the laser light favorably to the respective plural information recording faces and is therefore useful in, for example, information systems, such as computers, video equipment, audio equipment, and the like which perform recording and replaying of data recorded in various kinds of information recording media, such as a CD (Compact Disc), a DVD (Digital Versatile Disc), a BD (Blu-ray Disc), an EVD (Enhanced Versatile Disc), a HD-DVD (High Definition Digital Versatile Disc), and the like.

The present invention is not limited to the above described embodiment and can be put into practice in various forms without departing from the significant feature and/or the sprits thereof. Hence, the above embodiment is a mere example in every aspect and should not be construed limitedly. The scope of the present invention is defined in the appended claims and is not restricted by the description. Further, any modifications and alternations belonging to the equivalent range of the scope of the claims fall within the scope of the present invention.

What is claimed is:

1. An optical pickup for focusing a laser light onto a plurality of information recording faces provided in parallel with each other in an information recording medium, comprising:

a light source which emits the laser light;

an objective lens for focusing the laser light entering the objective lens onto the information recording faces; and an aberration correction element arranged at a base point located between the light source and the objective lens, a position of the aberration correction element being configured to be movable on an optical axis from the base point, the aberration correction element being configured to change a shape of the laser light by moving the position of the aberration correction element on the optical axis from the base point so that the laser light is focused onto a target information recording face out of the plurality of information recording faces, wherein, when the aberration correction element is located at the base point, the objective lens forms a laser light spot having minimum size at a point in the information recording medium, the point being apart from a light source side surface of the information recording medium by a distance of Lc defined by an expression (1):

$$L_c = (L_0 + L_n)/2 \quad (1),$$

wherein $L_0$ is a distance between the light source side surface of the information recoding medium and a nearest information recording face nearest to the light source side surface; and $L_n$ is a distance between the light source side surface of the information recording medium and a farthest information recording face farthest from the light source side surface.

2. The optical pickup of claim 1, wherein the aberration correction element is any of a collimator lens, a beam expander lens, and a liquid crystal element.

3. The optical pickup of claim 1, wherein distance between the light source side surface of the information recording medium and the nearest information recording face is less than 100 μm.

4. The optical pickup of claim 1 wherein a wavelength of the laser light is less than 420 nm.

5. The optical pickup of claim 1, wherein a NA in a region of the objective lens where the laser light enters is 0.8 or larger.

6. The optical pickup of claim 1, wherein the objective lens is set so that a distance, between the light source side surface of the information recording medium and a point on the optical axis where, when a parallel light enters the objective lens, an aberration becomes minimum, is less than 80 μm.

7. The optical pickup of claim 6, wherein the objective lens is set so as to satisfy a conditional expression (2):

$$\lambda_1 < 70 \, m\lambda \quad (2),$$

wherein, $\lambda_1$ is an aberration at the point on the optical axis where, when a parallel light enters the objective lens, the aberration becomes minimum; and λ is a wavelength of the laser light.

8. The optical pickup of claim 1, wherein the objective lens is composed of a single lens.

9. The optical pickup of claim 1, further comprising:
a detector which detects a reflected light of the laser light on any of the information recording faces.

10. An objective lens for focusing a laser light onto a plurality of information recording faces provided in parallel with each other in an information recording medium, the objective lens being used in an optical pickup, the optical pickup including:

a light source which emits the laser light; and an aberration correction element located at a base point located between the light source and the objective lens, a position of the aberration correction element being configured to be movable on an optical axis from the base point the aberration correction element being configured to change a shape of the laser light by moving the position of the aberration correction element on the optical axis from the base point, wherein the objective lens is configured to focus the laser light from the aberration correction element, and the objective lens is configured to satisfy the condition that, when the aberration correction element is located at the base point, a size of a spot formed by the objective lens becomes minimum at a point in the information recording medium, the point being apart from a light source side surface of the information recording medium by a distance of Lc defined by an expression (1):

$$L_c = (L_0 + L_n)/2 \quad (1),$$

wherein $L_0$ is a distance between the light source side surface of the information recoding medium and a nearest information recording face nearest to the light source side surface; and $L_n$ is a distance between the light source side surface of the information recording medium and a farthest information recording face farthest from the light source side surface.

* * * * *